(12) United States Patent
Chen

(10) Patent No.: US 8,384,282 B2
(45) Date of Patent: Feb. 26, 2013

(54) LED LAMPS USING RECYCLED METAL CONTAINERS AS HEAT SINKS AND THE METHOD OF MAKING THE SAME

(76) Inventor: Yujia Chen, Fuzhou (CN)

( * ) Notice: Subject to any disclaimer, the term of this patent is extended or adjusted under 35 U.S.C. 154(b) by 0 days.

(21) Appl. No.: 13/470,267

(22) Filed: Jun. 16, 2012

(65) Prior Publication Data
US 2012/0257392 A1 Oct. 11, 2012

Related U.S. Application Data

(63) Continuation-in-part of application No. 12/897,768, filed on Oct. 4, 2010.

(51) Int. Cl.
*H01J 1/62* (2006.01)
(52) U.S. Cl. ........................................ 313/498; 313/512
(58) Field of Classification Search .................... 313/11, 313/45, 46, 47, 498, 512
See application file for complete search history.

(56) References Cited

U.S. PATENT DOCUMENTS
2010/0219735 A1* 9/2010 Sakai et al. ..................... 313/46
* cited by examiner

*Primary Examiner* — Vip Patel
(74) *Attorney, Agent, or Firm* — Enterprise Partners LLC; Yonghao Hou

(57) ABSTRACT

The core of this invention is to replace lamp cups with recycled metal cans (after pretreatment processes) as a good heat sink of the LED lamps. The heat sink adheres to the lamp bases, LED circuit boards and lamp covers through advanced technology, thereby producing a variety of LED lamps. As a result, the invention achieves a complete metal construction of LED lamps which not only improves the thermal performance of LED lamps but also develops a low-carbon, environmentally friendly and economical way of metal containers recycling. Consequently, these improved LED lamps are suited to be widely used for the purpose of illumination or decoration. A semi-knocked-down DIY kit for end users to assemble such improved thermal performance LED lamp and the method of making it are provided herein.

2 Claims, 12 Drawing Sheets

LED LAMPS USING RECYCLED METAL CONTAINERS AS HEAT SINKS AND THE METHOD OF MAKING THE SAME

CROSS-REFERENCE TO RELATED APPLICATIONS

This application is a continuation-in-part of the U.S. utility application Ser. No. 12/897,768 filed Oct. 4, 2010 and the priority application is incorporated herein entirely.

FIELD OF THE INVENTION

This disclosure relates to the field of Light Emitting Diodes (LED) lamps, especially LED lamps using recycled metal containers as their heat sinks. This invention further introduces method of making these energy preserving LED lamps.

BACKGROUND

LED lamps offer long service life and high energy efficiency but initial costs are higher than those of fluorescent and incandescent lamps. Lifespan of LED lamps is multiple compared to incandescent lamps. However, the degradation of LED chips reduces luminous flux over their lifespan as with conventional lamps.

LEDs are degraded or damaged by operating at high temperatures, so LED lamps typically include heat dissipation elements such as heat sinks and cooling fins.

Most of the recycled metal beverage cans, such as Coca-Cola®, Pepsi Cola®, Tsingdao® and Budweiser® are made of aluminum. Red bull®, Wa ha ha® and Wong Lo Kat® cans are made of tinplate. These beverage cans are not used until after melting, refinement, and a series of metal processing. Therefore, a considerable amount of energy is consumed unavoidably during the recycling process of the metal cans, which obviously diverges from the prevailing theme of "Low-Carbon Economy" all over the contemporary world.

This disclosure introduces a novel use of metal containers in making LED lamps to prolong LED lamps lifespan, and avoids excessive energy waste for recycling these metal containers. This disclosure further introduces the Do it Yourself (DIY) kit for customers to assembly energy preserving LED lamps.

SUMMARY

This disclosure provides an energy preserving LED lamp. It has at least the following parts: a. a lamp base; b. at least one lamp cup made of recycled metal retainer; c. a polycarbonate lamp cover; and d. an LED circuit board with a layer of copper foil. In this energy preserving LED lamp, the lamp base is fixed to one end of the lamp cup through a plastic electrically insulating shell, and the lamp cup adheres to the copper foil layer of the circuit board through an adhesive.

In the above mentioned LED lamp, the recycled metal container is a heat sink.

In one preferred embodiment, the adhesive is thermally conductive and electrically insulating material, for example, an epoxy resin.

In another preferred embodiment, the adhesive is a tin solder. When the adhesive is a tin solder, the outer bottom of the recycled container further contains metal plating soldered to the copper foil layer of the circuit board through the tin solder.

In yet another preferred embodiment, the light color of the lamp is white or other different color.

In yet another preferred embodiment, the LED lamp is used for illumination or decoration.

This disclosure further provides a semi-knocked-down do-it-yourself LED lamp kit containing at least the following components:
a. an E26 or E27 base connected to a constant current power supply;
b. a polycarbonate lamp cover;
c. a printed circuit board (PCB) with at least one LED lamp bead;
d. a pair of electrical wires connected to the power supply and the PCB;
e. a recycled metal container with a hole at the bottom to accommodate the electrical wires and the PCB through a specially designed and manufactured hollow M6/M3 screw. The lamp base is fixed to the top of the container, and the lamp cover is fixed to the bottom of the container; and
f. a plastic disc insulating the lamp base and the metal container. The plastic disc acts as a template for drilling aforementioned hole on the bottom of recycled metal container.

This disclosure further provides a method of assembling a semi-knocked down LED lamp. The method comprising the following steps:
a. providing the following components: a lamp base, a polycarbonate lamp cover, a recycled metal container with a hole of 6 millimeter in the bottom of the container, a constant-current power supply, a printed circuit board (PCB) coupled with at least one LED lamp beads; preferably 3 LED lamp beads, a specially designed and manufactured hollow screws (M6/M3), at least one M6 nut, a pair of electrical wires to connect to the power supply, at least one self-tapping screws (M3) (in case of the lamp base has no click in function, 3 M3 screws are in need), and a plastic disc configured to be the template of drilling the hole at the recycled container to accommodate the specially designed and manufactured hollow screws;
b. using a tow wire to induce the specially designed and manufactured screw M6/M3 to fix the PCB set on to the bottom of the recycled container;
c. connecting the electrical wires to the power supply through the hollow screw pair (M6/M3);
d. fit the lamp base set to the top of the recycled metal container, and the lamp cover to the bottom of the recycled metal container;
e. lock the lamp base by tightening the self-tapping screws.

DETAILED DESCRIPTION

Figure 1:
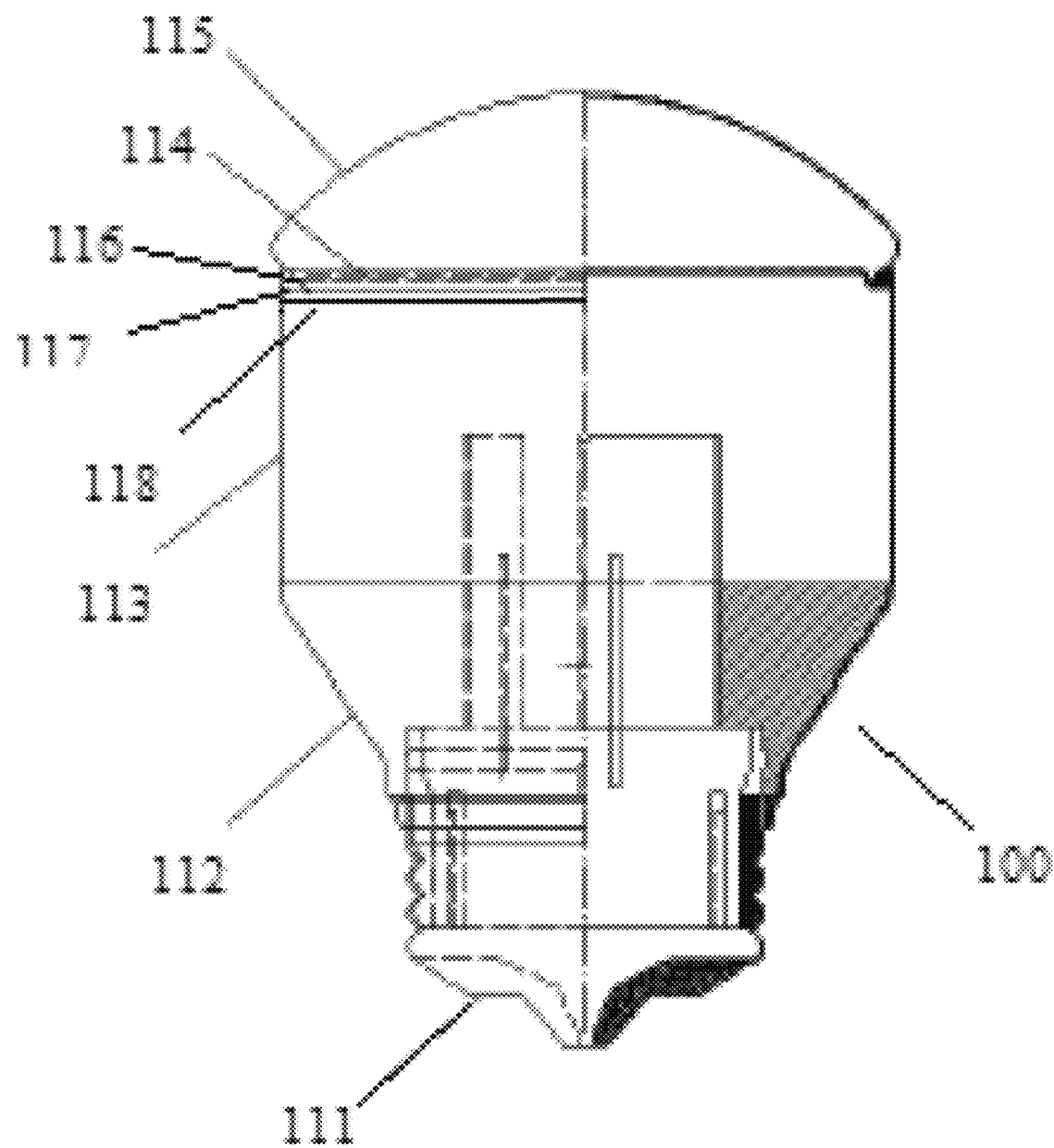
FIG. 1 A schematic diagram of an LED lamp using recycled metal containers as heat sinks.

While the concepts of the present disclosure are illustrated and described in detail in the figures and the description herein, results in the figures and their description are to be considered as exemplary and not restrictive in character; it being understood that only the illustrative embodiments are shown and described and that all changes and modifications that come within the spirit of the disclosure are desired to be protected.

Unless defined otherwise, the terms and tools in making this disclosure have the same meaning as commonly understood by a person in the ordinary skill in the art pertaining to this disclosure.

In electronic systems, a heat sink is a passive component that cools a device by dissipating heat into the surrounding air. Heat sinks are used to cool electronic components such as high power semiconductor devices, and optoeletctronic devices such as higher power lasers and light emitting diodes (LEDs). High thermal conductivity is in demands for materials used as heat sinks. Thermal conductivity of metal materials is higher than 60 watts per kelvin per meter. It is contemplated herein that recycled metal containers are ideal material for heat sinks.

With the development of the LED lamps, more and more heat generates during their work because of the continued requests for a smaller volume but higher power. For LED lamps, the heat generates during their workings negatively affects their luminance and lives. When an LED lamp is overheating, its luminance becomes lower, its color turns lighter and the lifespan is shortened. It is imperative to improve the thermal performance of LED lamps significantly. This disclosure uses recycled cans as LED lamps' heat sinks and resolved the demands of low carbon economy and improves the thermal performance of LED lamps.

DETAILED DESCRIPTION OF THE INVENTION

This disclosure overcomes the insufficiency of current technology and provides a new assembly of LED lamps using recycled metal containers as heat sinks.

The LED lamp in this disclosure includes at least following main parts: a lamp base 111, a lamp cup 113, an LED circuit board 114 with a layer of copper foil 116, and a lamp cover 115. Among these main parts, the lamp base 111 is fixed to one end of the lamp cup 113 through a plastic electrically insulating shell 112; the lamp cover 115 is fixed to the other end of the lamp cup 113. The LED circuit board 114 is fixed to the outer bottom of lamp cup 113 and contained in the space between the lamp cup 113 and the lamp cover 115. Recycled metal containers (after the pretreatment processes such as cleaning, sterilization, etc.) are directly used as lamp cups 113. The outer bottom of lamp cup 113 is used as the metal surface for the adhering of LED circuit board 114. The LED circuit board 114 further has a layer of copper foil 116. The copper foil 116 adheres to the metal surface through an adhesive 117.

The recycled metal containers mentioned above are made of a variety of common metal materials.

In one preferred embodiment, the adhesive 117 mentioned above (type one) is a thermally conductive and electrically insulating material. The copper foil layer 116 of the circuit board 114 adheres to the outer bottom of the lamp cup 113 through this thermally conductive and electrically insulating material. Examples of thermally conductive and electrically insulating materials include but not limited to epoxy resin.

In another preferred embodiment, the adhesive 117 mentioned above (type two) is a tin solder. When the tin solder is used as the adhesive 117, the outer bottom of the lamp cup 113 mentioned above is plated with metal plating 118. The copper foil layer 116 of the circuit board 114 is soldered to this metal plating of the lamp cup 113 through the tin solder.

The metal plating mentioned above is made through electroplating, chemical plating, vapor deposition or sputtering deposition.

The LED lamps disclosed herein using recycled metal containers as heat sinks can use either tin solder or thermally conductive and electrically insulating adhesive as the adhesive applied between lamp cup 113 and circuit board 114. But the thermally conductive and electrically insulating adhesive works better than tin solder as the adhesive applied between lamp cup 113 and circuit board 114.

The benefits of this invention are multiple. The heat sink controls the working temperature of the LED lamps efficiently and greatly improves the thermal performance of the LED lamps. At the same time, it also develops a recycling process of the metal containers, therefore meeting "low-carbon, eco-friendly and economical" demand of the modern world.

Based on the aforementioned model of using recycling metal container works as the heat sink of LED lamp, a semi-knocked-down do it yourself LED lamp assembly is developed to give the convenience and choices to the end users.

Briefly, the kit contains a list of major parts that are easily assembled. The list include: a lamp base, for example, E26 or E27 lamp bases; a polycarbonate lamp cover; a constant-current power supply; a Printed circuit board (PCB) with at least one LED lamp bead, preferably 3 LED lamp beads; a specially designed and manufactured screw M6/M3 for fixing the PCB; Nut M6; a pair of electrical wires (red and black); one or three self-tapping screws (M3) for fixing the lamp base; a piece of wire for towing the specially designed and manufactured hollow screw M6/M3 for fixing the PCB; and a plastic disc used as the insulator between the lamp base and the metal container. The plastic disc is also used as the template for drilling matching holes in the top and the bottom of the metal container to accommodate the hollow screw M6/M3.

Figure 2:
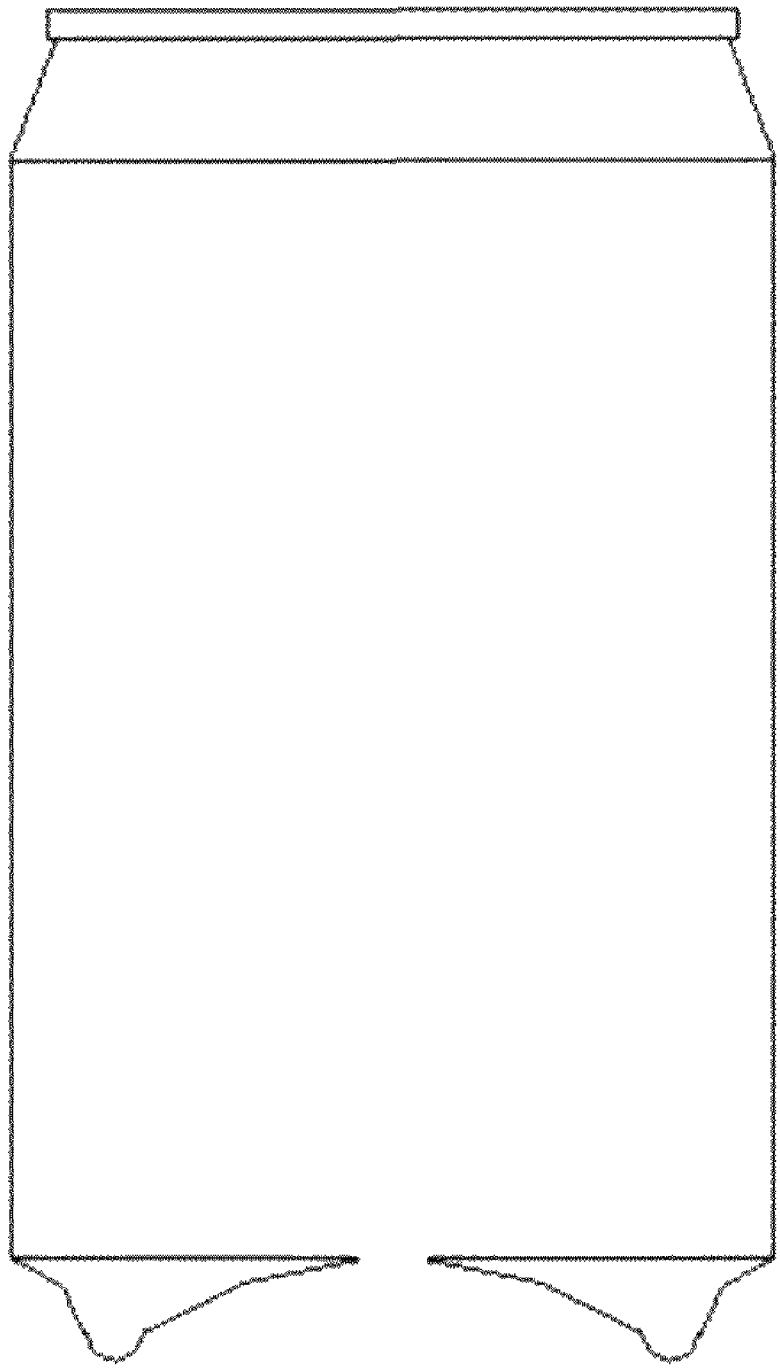
FIG. 2 Diagram of a recycled metal container with a 6-millimeter diameter hole in the bottom.

The lamp base set includes both the E26 or E27 base, and the constant-power supply. The PCB and a pair of electrical wires constitute the PCB set. The screw M6/M3 is a specially processed hollow screw with M6 screw thread on the outside surface and M3 screw thread on the inside surface. The assembly procedure of the lamp by using the SKD kit is shown as following:

Step 1: Drill a 6-millimeter diameter hole in the bottom of the metal container, as shown in FIG. 2

Figure 3:
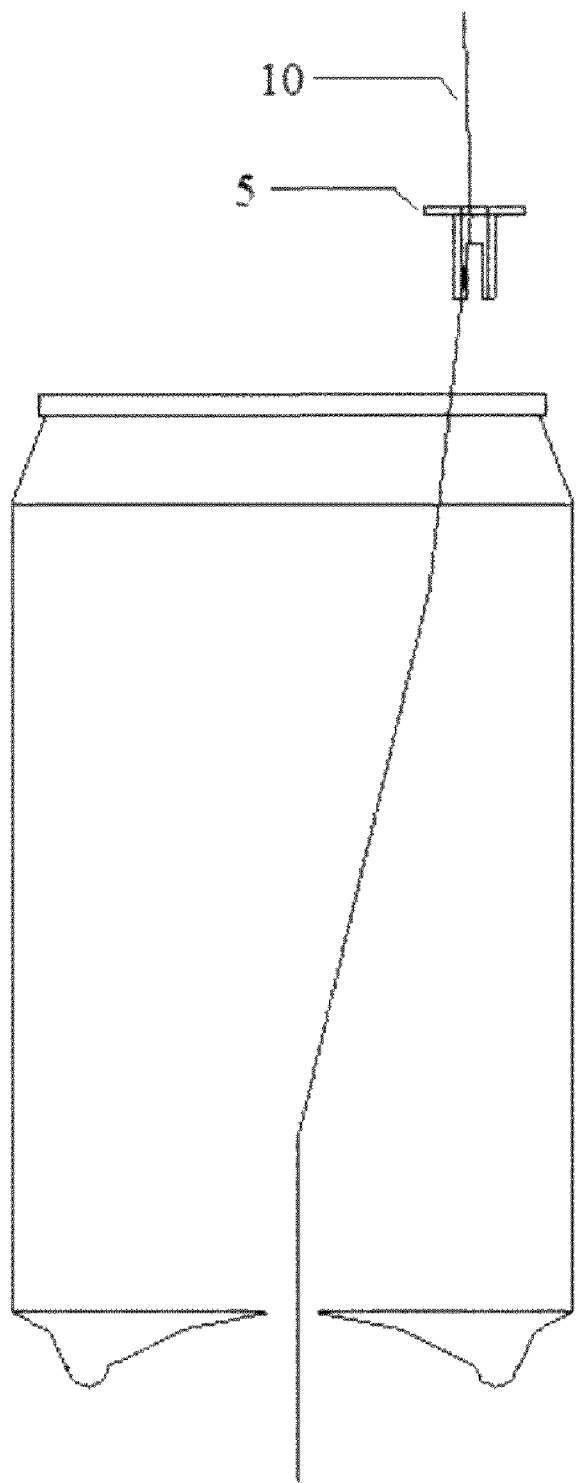
FIG. 3. Specially manufactured screw set is towed by wire and fixed into the hole of the container bottom.

Step 2: Have the Screw M6/M3 towed by the tow wire, thereby fixed into the hole in the bottom of the container, as shown in FIG. 3

Figure 4:
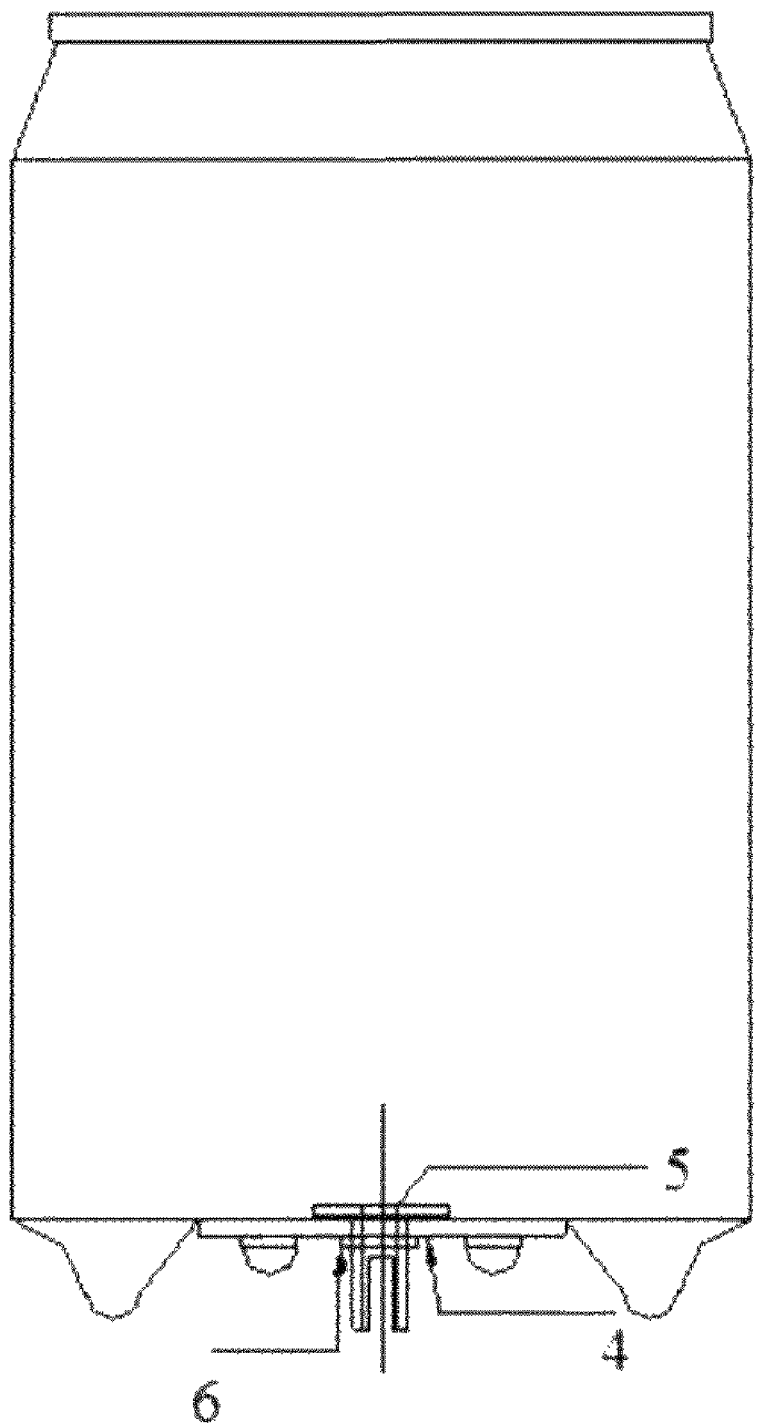
FIG. 4. Diagram of printed circuit board set fit to the bottom of the recycled metal container.

Step 3: Fix the PCB set to the bottom of the container by tightening the M6 nut, as shown in FIG. 4

Figure 5:
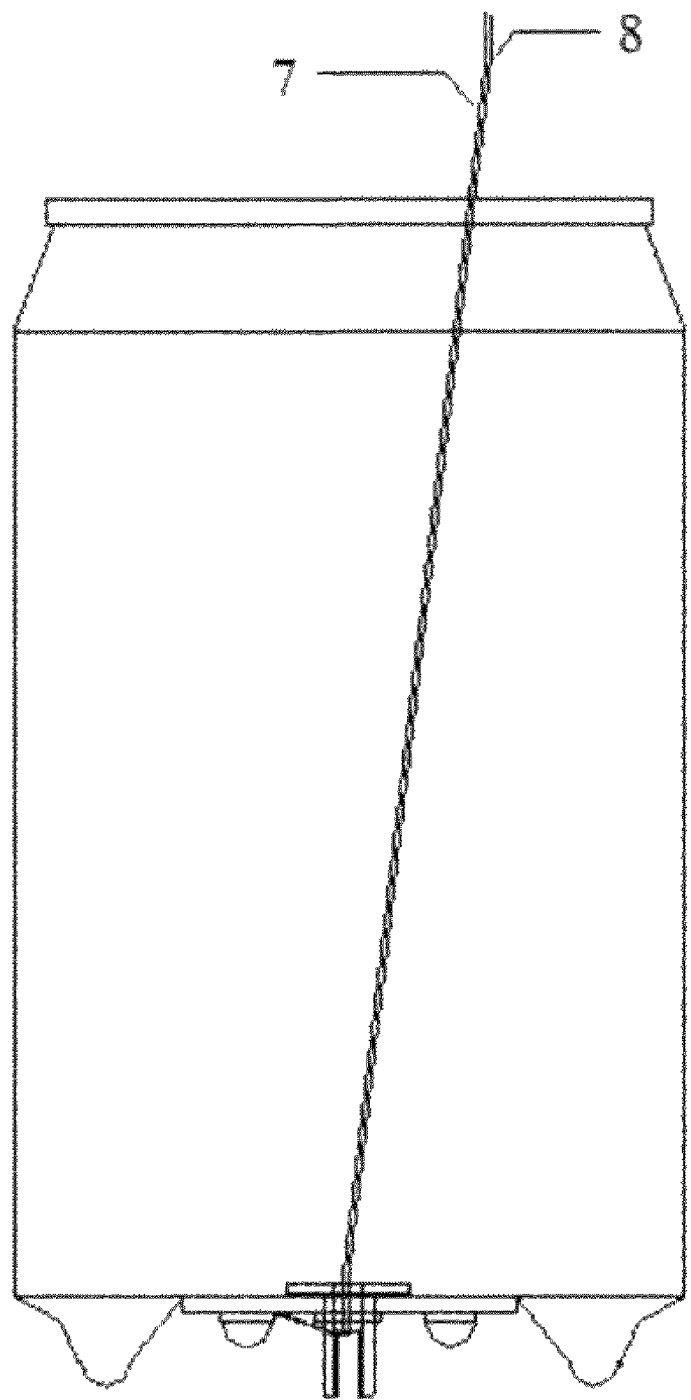
FIG. 5. Diagram of the power supply wire going through the recycled metal container.

Step 4: Make sure both the red and black electrical wires go through the hollow of the screw M6/M3 and reach out from the top of the container, as shown in FIG. 5

Figure 6:
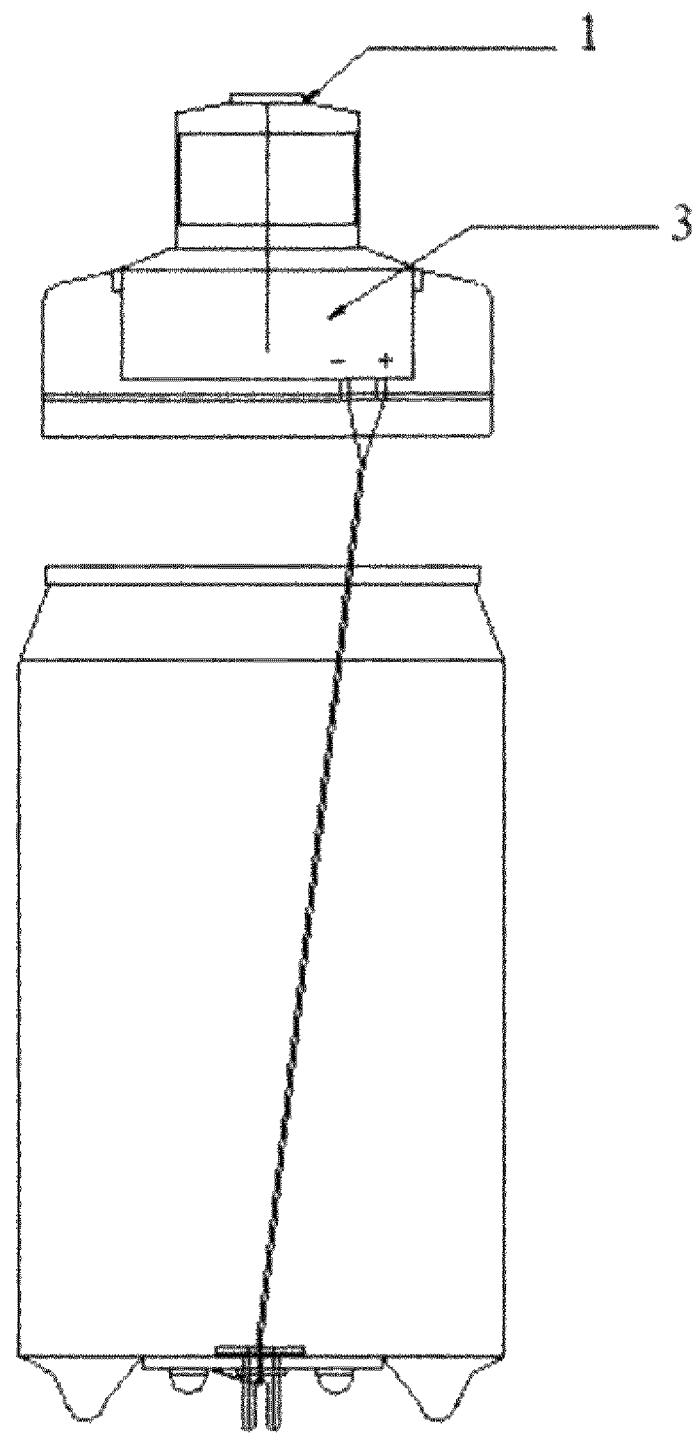
FIG. 6 Diagram of power connection for LED lamp using recycled metal container.

Step 5: Connect the red electrical wire to the anode of the power supply, and the black electrical wire to the cathode of the power supply, as shown in FIG. 6

Figure 7:
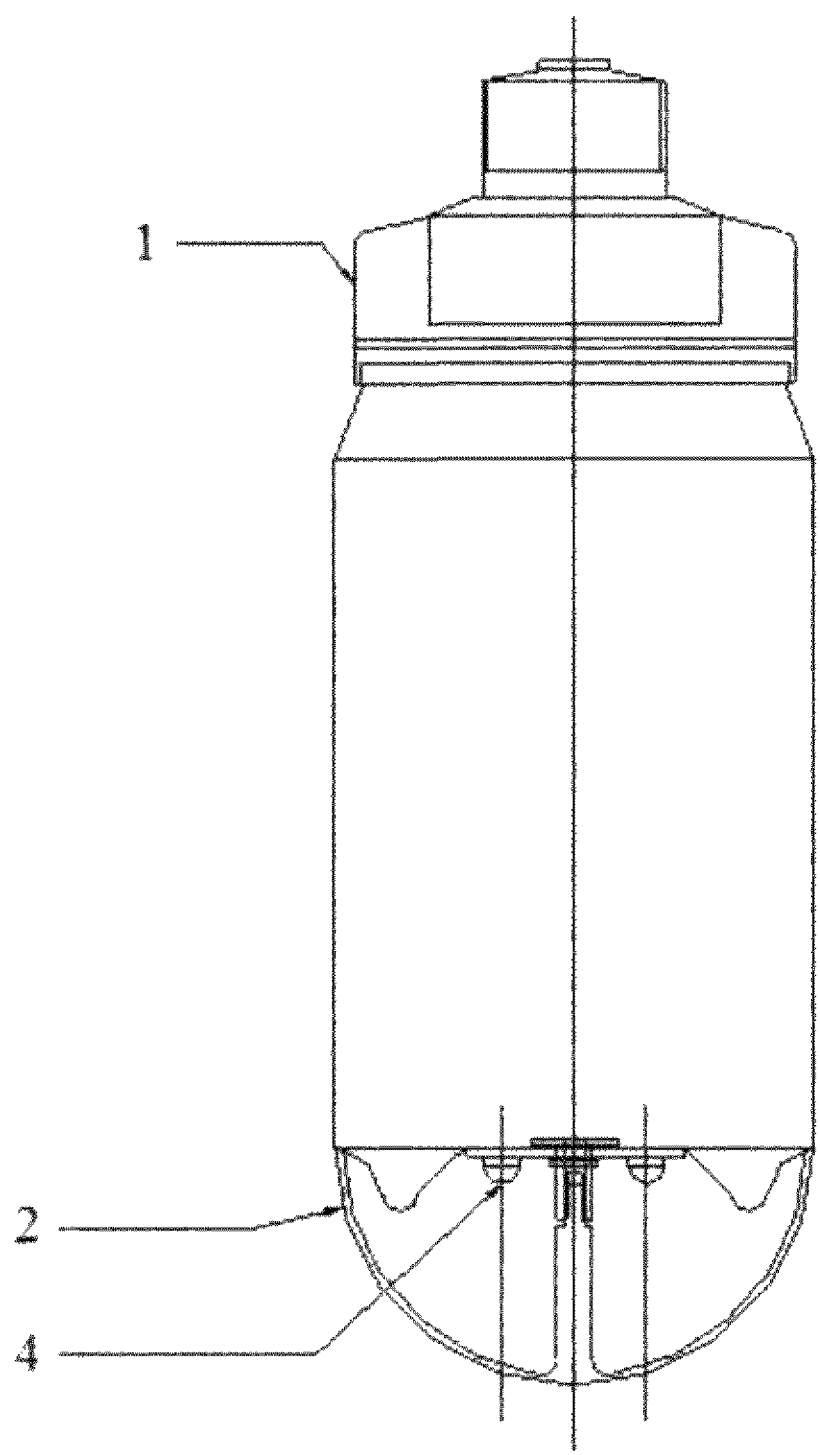
FIG. 7 Diagram of an assembled LED lamp using recycled Metal container as a heat sink. Lamp base set is fixed to the top of the container and lamp cover is fixed to the bottom of the container.

Step 6: Fit the Lamp base set to the top of the container, and have the lamp cover fixed to the bottom of the container, as shown in FIG. 7

Step 7: Test the lamp.

Figure 8:
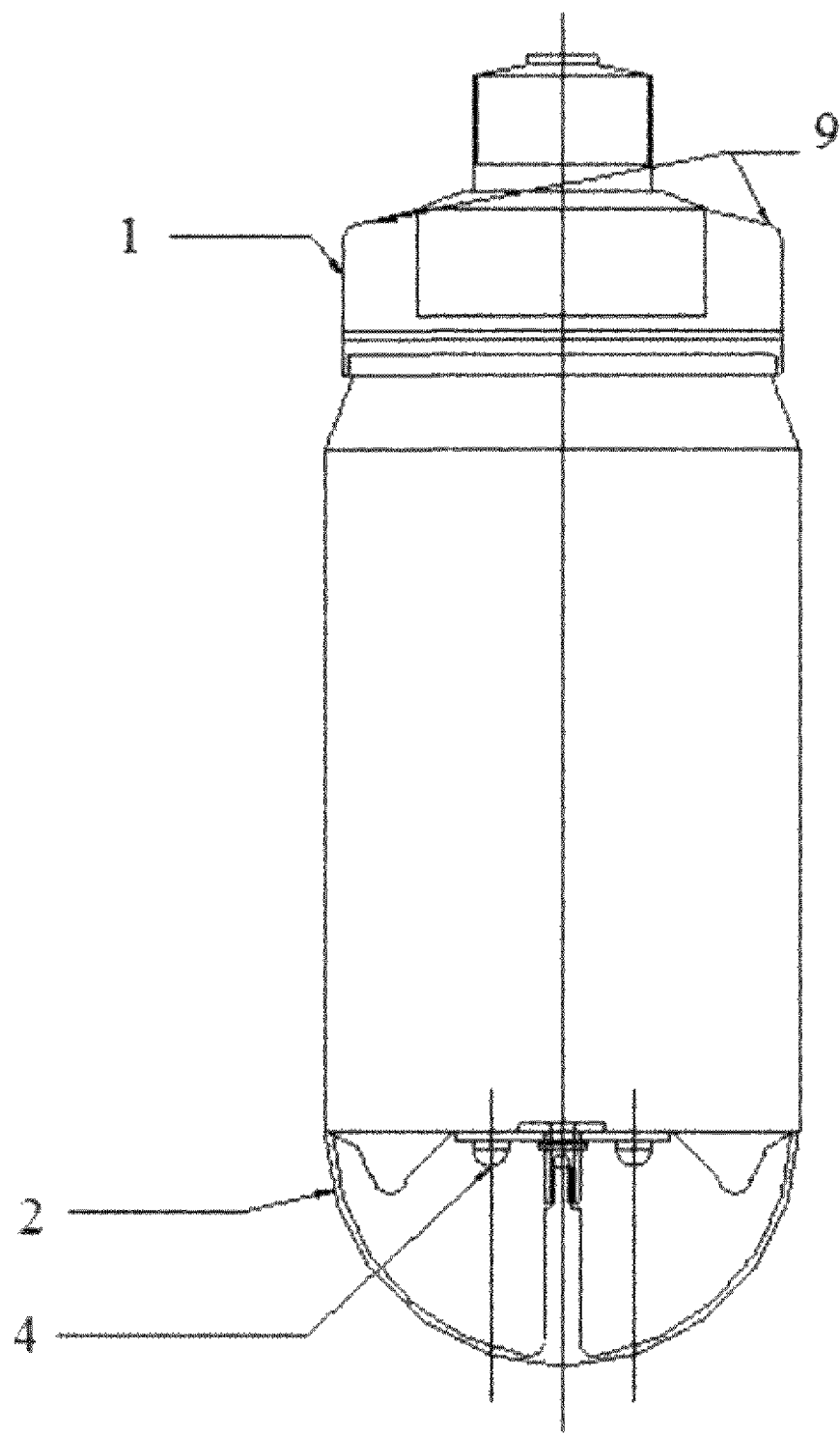
FIG. 8 An assembled LED lamp using recycled metal container as a heat sink. The lamp base set is fixed to recycled metal container top and the lamp cover is fixed to the recycled metal container bottom.
Figure 9:
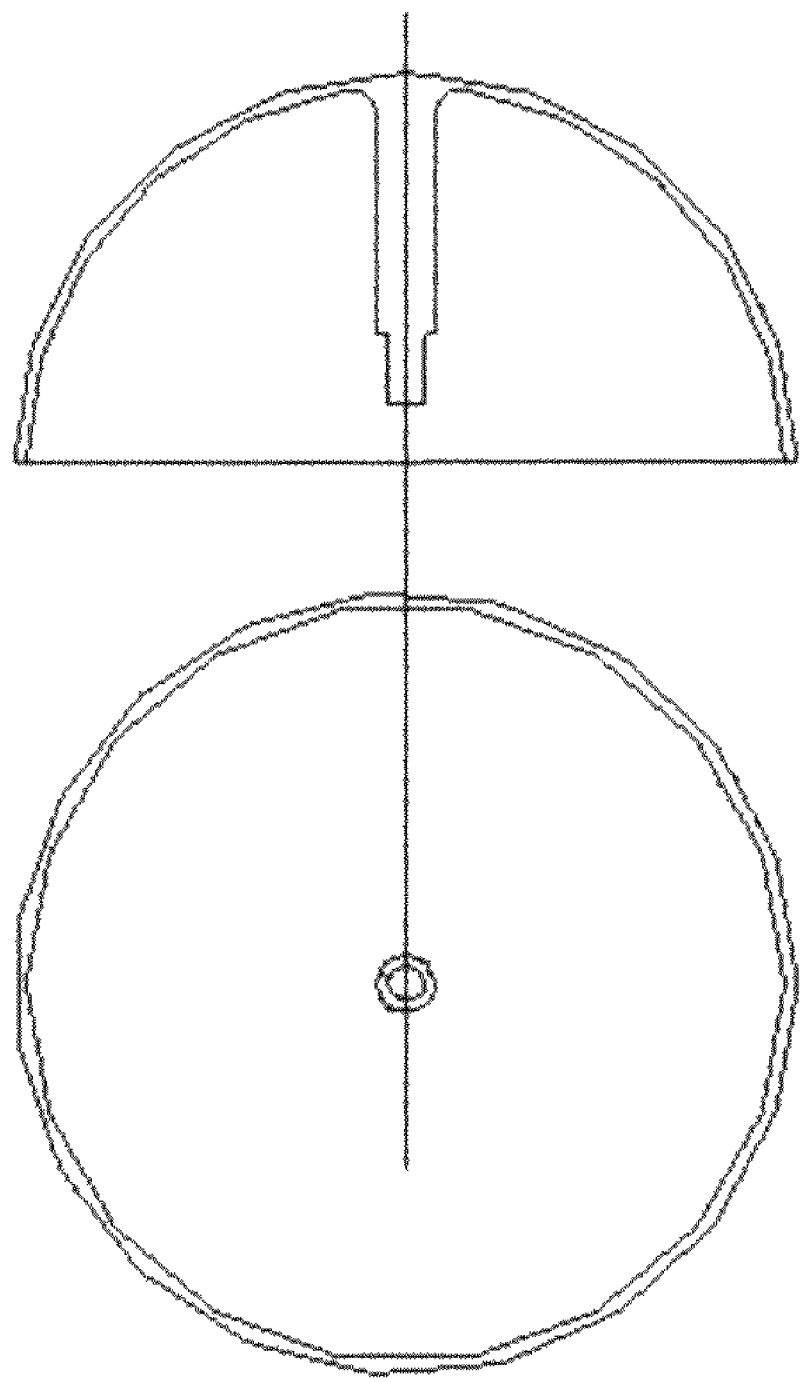
FIG. 9 Lamp cover measurements.
Figure 10:
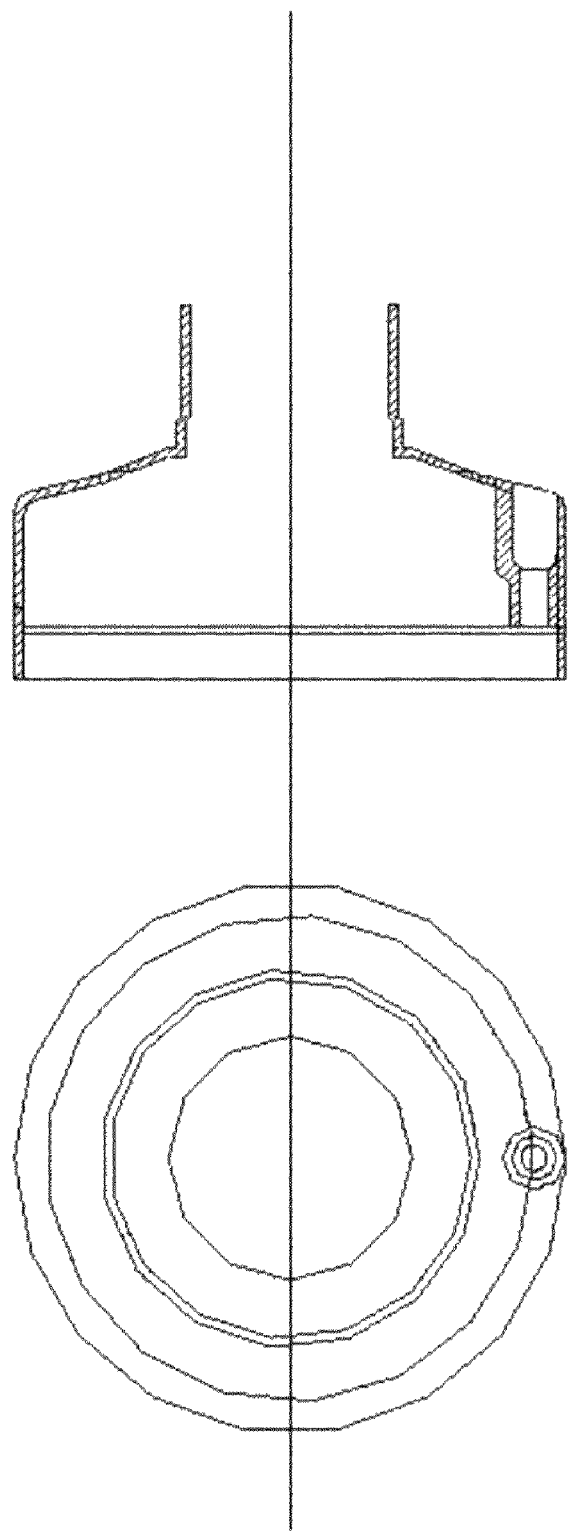
FIG. 10 Lamp base set measurement.
Figure 11:
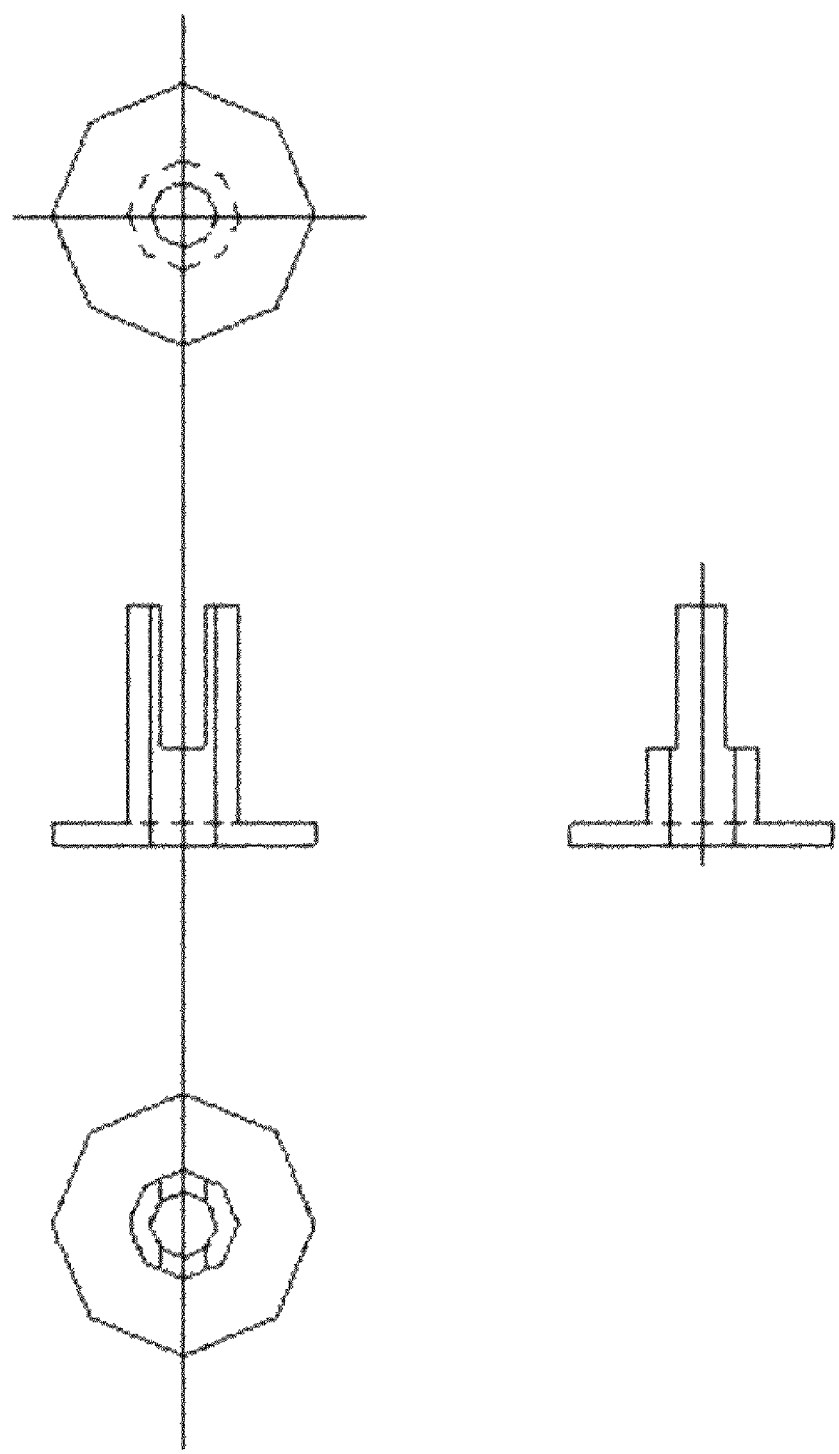
FIG. 11. Screw M6/M3 measurement for fixing PCB.
Figure 12:
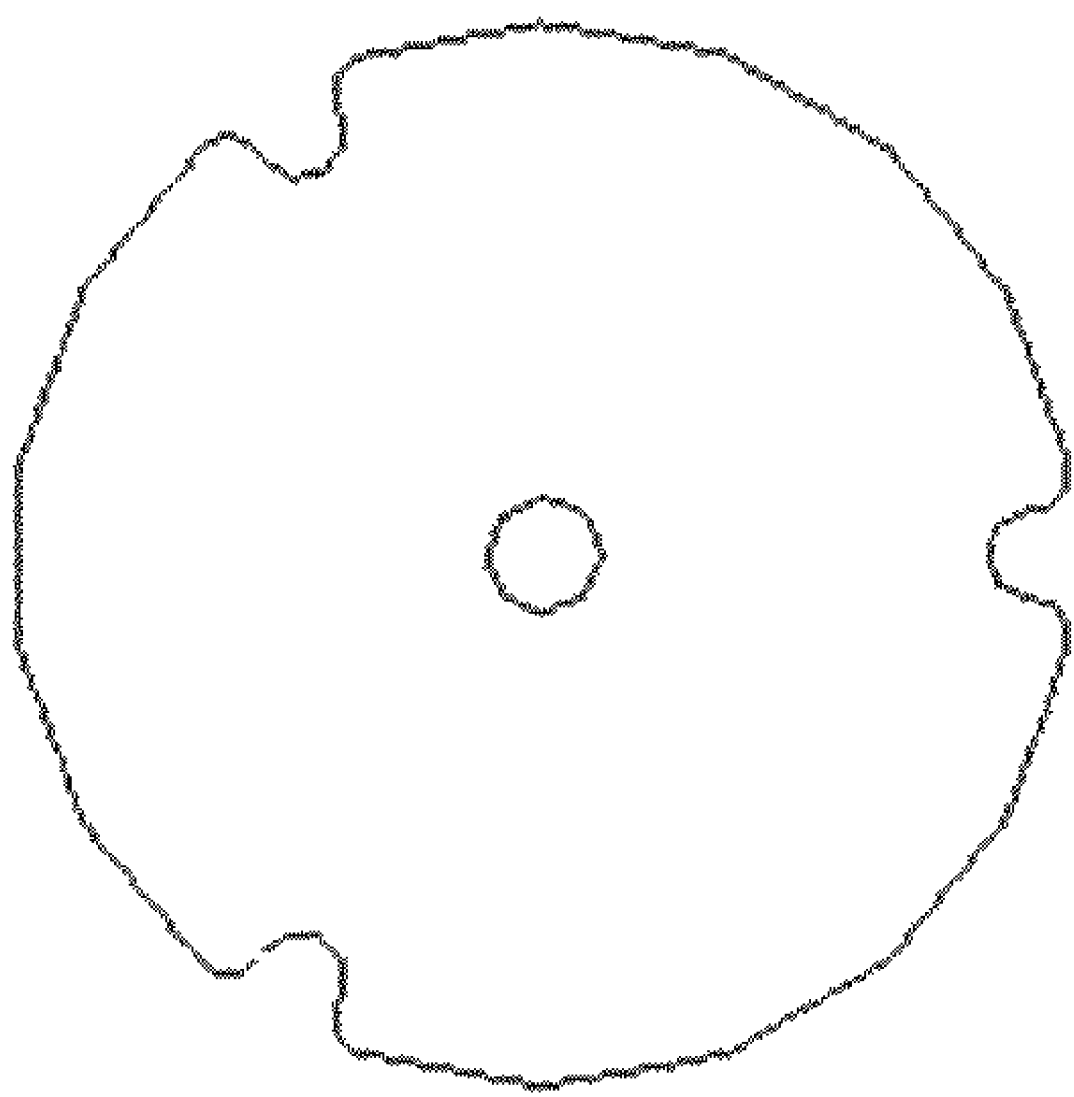
FIG. 12. A plastic disc used as the insulator between the lamp base and the metal container, and also used as the template for drilling a hole in the bottom of the metal container.

Step 8: Lock the Lamp base set by tightening one or three self-tapping screws M3, as shown in FIG. 8

The following examples give further instruction of this disclosure. It is not limited to any of these preferred embodiments.

EXAMPLES

Example 1

LED Lamp using Recycled Metal Container as a Heat Sink

Referring to FIG. 1 is an LED lamp using recycled metal containers as a heat sink. The scheme comprises at least the following parts: a lamp base 111, a plastic electrically insulating shell 112, a lamp cup 113, an LED circuit board 114 with a layer of copper foil 116, and a lamp cover 115.

FIG. 1 shows the claimed invention of LED lamp 100. The lamp base 111 is fixed to one end of the lamp cup 113 through a plastic electrically insulating shell 112. The lamp cover 115 is fixed to the other end of the lamp cup 113. The LED lamp's circuit board 114 is fixed to the outer bottom of the lamp cup, 113 and it is contained in the space surrounded by the outer bottom of the lamp cup 113 and the lamp cover 115. The recycled metal container, i.e., lamp cup 113, (after the pretreatment processes such as cleaning, sterilization, etc.) is directly used as the lamp cup 113. The outer bottom of lamp cup 113 is used as a metal surface for its adhering to circuit board 114. The circuit board 114 further has a layer of copper foil 116 which adheres to the metal surface through a selective adhesive 117.

As an optimum, the recycled metal container mentioned above is aluminum beverage can.

The adhesive 117 mentioned above can be either a thermally conductive and electrically insulating adhesive material, or a tin solder. When using the thermally conductive and electrically insulating material, the copper foil layer 116 of the circuit board 114 is adhered to the outer bottom of the lamp cup 113 through this adhesive 117. When using the tin solder as the adhesive 117, the outer bottom of the lamp cup 113 needs to be plated with a metal plating 118 to improve its solderability since it is made of aluminum. After that, the copper foil layer 116 of the circuit board 114 can be soldered to the metal plating 118.

The metal plating on the outer bottom of the lamp cup 113 mentioned above is made through electroplating, chemical plating, vapor deposition or sputtering deposition.

As an optimum, the thermally conductive and electrically insulating adhesive is used as the adhesive through which the circuit board 114 is fixed to the lamp cup 113. For example, resins, the matrix of thermally conductive and electrically insulating adhesive, is a kind of glue. An appropriate curing temperature is chosen during adhering, for example, epoxy resin adhesive can be cured at room temperature or the temperature up to 302° F. (150° C.), which is much lower than the tin soldering temperature of above 392° F. (200° C.) and therefore avoid the material deformation, thermal fatigue of electronic components and internal stress caused by the high soldering temperature. Moreover, the minimum pitch of tin soldering of 0.0256 inch (0.65 mm) makes the tin soldering already not be able to meet the demand for the electrically conductive connection of the circuit boards because of the trend of miniaturization and higher density of them while the thermally conductive and electrically insulating adhesive can be made into a variety of thermally and electrically conductive adhesives by adding different kinds of metal powders, thus achieving a high line resolution. Additionally, the process of thermally conductive and electrically insulating adhesive is simple and easy to operate, which can increase productivity and prevent the heavy metal pollution caused by lead in tin solder.

The metal beverage cans have a high thermal conductivity and the excellent thin metal wall.

Additionally, the cans are cleaned by an advanced cleaning technology which guarantees the cleanliness of the surface and reduces the thermal resistance, thus enhancing the thermal conductivity. For these reasons, this invention uses recycled metal containers, especially recycled aluminum beverage cans as LED lamp cups and adhesive, especially thermally conductive and electrically insulating adhesive, to adhere or solder the copper foil layer of the circuit boards to the lamp cups, which achieve not only a compete metal construction, a better thermal performance and a efficiently controlled working temperature of LED lamps, but also a way of metal containers recycling which meets the request of "low-carbon, enviromnentally friendly and economical".

The preferred embodiment mentioned above is only for a further instruction of a type of this invention: LED lamps using recycled metal beverage cans as heat sinks, but this invention is not limited to the preferred embodiment. Any simple modification, equivalent change or decoration to the preferred embodiment based on the essential technologies of this invention is inside the scope of protection of the technical program of this invention.

Example 2

A Semi-Knocked-Down LED Lamp Kit for Do It Yourself Assembly

The preferred embodiment 2 is a semi-knocked-down (SKI)) kit for Do-It-Yourself (DIY) assembly of the lamp by customers. Referring to FIGS. 2-12, the semi-knocked-down LED lamp kit enables an ordinary consumer to assemble an LED lamp with recycled metal container as its heat sink.

The kit contains a list of major parts that are easily assembled. The list include: a lamp base 1 in FIG. 3, for example, E26 or E27 lamp bases; a polycarbonate lamp cover 2; constant-current power supply 3; a Printed circuit board 4 (PCB) with at least one, preferably 3 LED lamp beads; a specially designed and manufactured screw 5 (M6/M3) for fixing the PCB; Nut 6 (M6); a pair of electrical wires (red 7 and black 8); one or three self-tapping screws 9 (M3) for fixing the lamp base; a piece of wire 10 for towing the specially designed and manufactured hollow screw 5 (M6/M3) for fixing the PCB; and a plastic disc 11 used as the insulator between the lamp base and the metal container. The plastic disc 11 is also used as the template for drilling matching holes in the top and the bottom of the metal container to accommodate the hollow screw 5 (M6/M3).

The lamp base set includes both the E26 or E27 base 1, and the constant-power supply 3. The PCB 4 and a pair of electrical wires 7 and 8 constitute the PCB set. The screw 5 (M6/M3) is a specially processed hollow screw with M6 screw thread on the outside surface and M3 screw thread on the inside surface.

The assembly procedure of the lamp by using the SKD kit is shown as following:

Step 1: Drill a 6-millimeter diameter hole in the bottom of the metal container, as shown in FIG. 2.

Step 2: Have the Screw 5 M6/M3 towed by the tow wire 10, thereby screw 5 is fixed into the hole in the bottom of the container, as shown in FIG. 3

Step 3: Fit the PCB set 4 to the bottom of the container by tightening the M6 nut 6, as shown in FIG. 4

Step 4: Make sure both the red and black electrical wires 7 and 8 go through the hollow of the screw 5 M6/M3 and reach out from the top of the container, as shown in FIG. 5

Step 5: Connect the red electrical wire 7 to the anode of the power supply 3, and the black electrical wire 8 to the cathode of the power supply 3, as shown in FIG. 6

Step 6: Fit the Lamp base set 1 and 3 to the top of the container, and have the lamp cover 2 fixed to the bottom of the container, as shown in FIG. 7

Step 7: Test the lamp.

Step 8: Lock the Lamp base set 1 and 3 by tightening one or three self-tapping screws 9 M3, as shown in FIG. 8

It should be understood that the foregoing relates to exemplary embodiments of the disclosure and that modifications may be made without departing from the spirit and scope of the invention as set forth in the following claims.

The invention claimed is:

1. A self-assembly LED lamp kit containing at least the following components:
   a. A lamp base connected to a constant-current power supply;
   b. a polycarbonate lamp cover;
   c. a printed circuit board (PCB) with at least one LED lamp bead;
   d. a pair of electrical wires connected to said power supply and said PCB;
   e. a recycled metal container with a hole at the bottom to accommodate said electrical wires and said PCB through a hollow screw, said hollow screw having M6 screw thread on the outside surface and M3 screw thread on the inside surface, wherein said lamp base is fixed to the top of the container, and said lamp cover is fixed to the bottom of the container; and
   f. a plastic disc insulating said lamp base and said metal container, wherein said plastic disc also acts as a template for drilling said hole on the bottom of said recycled metal container.

2. A method of assembling a self-assembly LED lamp, comprising the following steps:
   a. providing the following components:
      a lamp base;
      a polycarbonate lamp cover;
      a recycled metal container with a hole of 6 millimeter in the bottom of said container;
      a constant current power supply;
      a printed circuit board (PCB) coupled with at least 1 LED lamp beads;
      a hollow screw, said hollow screw having M6 screw thread on the outside surface and M3 screw thread on the inside surface;
      at least one M6 nut;
      a pair of electrical wires to connect to the power supply;
      at least one self-tapping screw and a plastic disc configured to be the template of drilling matching holes at the said container to accommodate said hollow screw;
   b. using a tow wire to induce said hollow screw to fit said PCB set on to the bottom of said recycled container;
   c. connect said electrical wires to said power supply through said hollow screw;
   d. fit said lamp base set to the top of said recycled metal container, and said lamp cover to the bottom of said recycled metal container;
   e. lock said lamp base by tightening said self-tapping screws.

* * * * *